United States Patent
Foley et al.

(10) Patent No.: US 10,459,735 B2
(45) Date of Patent: Oct. 29, 2019

(54) SCALABLE BOOT OPTIONS FOR A PROCESSOR/CONTROLLER

(71) Applicant: Texas Instruments Incorporated, Dallas, TX (US)

(72) Inventors: David Peter Foley, Sugar Land, TX (US); Santosh Kumar Athuru, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 99 days.

(21) Appl. No.: 15/178,778

(22) Filed: Jun. 10, 2016

(65) Prior Publication Data

US 2017/0123811 A1     May 4, 2017

Related U.S. Application Data

(60) Provisional application No. 62/250,642, filed on Nov. 4, 2015.

(51) Int. Cl.
| | |
|---|---|
| *G06F 9/4401* | (2018.01) |
| *G06F 9/445* | (2018.01) |
| *G06F 1/3203* | (2019.01) |

(52) U.S. Cl.
CPC .............. *G06F 9/441* (2013.01); *G06F 9/445* (2013.01); *G06F 1/3203* (2013.01)

(58) Field of Classification Search
CPC ......... G06F 9/441; G06F 9/445; G06F 1/3203
See application file for complete search history.

(56) References Cited

U.S. PATENT DOCUMENTS

| | | | | |
|---|---|---|---|---|
| 8,826,261 | B1* | 9/2014 | Anand AG | G06F 8/665 |
| | | | | 712/243 |
| 2005/0228980 | A1* | 10/2005 | Brokish | G06F 21/575 |
| | | | | 713/2 |
| 2006/0005005 | A1* | 1/2006 | Lee | G06F 8/66 |
| | | | | 713/2 |
| 2007/0283072 | A1* | 12/2007 | Johnson | G06F 11/3664 |
| | | | | 710/305 |
| 2008/0222407 | A1* | 9/2008 | Carpenter | G06F 21/575 |
| | | | | 713/2 |
| 2009/0172380 | A1* | 7/2009 | Cumming | G06F 9/441 |
| | | | | 713/2 |
| 2010/0070749 | A1* | 3/2010 | Tsai | G06F 9/441 |
| | | | | 713/2 |
| 2012/0303941 | A1* | 11/2012 | Grieco | G06F 21/575 |
| | | | | 713/2 |
| 2014/0244990 | A1* | 8/2014 | Barrett | G06F 9/4411 |
| | | | | 713/2 |
| 2015/0277778 | A1* | 10/2015 | Adams | G06F 13/385 |
| | | | | 710/5 |

\* cited by examiner

*Primary Examiner* — Jaweed A Abbaszadeh
*Assistant Examiner* — Gayathri Sampath
(74) *Attorney, Agent, or Firm* — Ebby Abraham; Charles A. Brill; Frank D. Cimino

(57) ABSTRACT

An integrated circuit (IC) chip and method of booting the IC are disclosed. The method includes determining whether a boot pin configuration has been programmed and responsive to determining that the boot pin configuration has been programmed, performing a boot method indicated in a user-defined boot table. Responsive to determining that the boot pin configuration key has not been programmed, the method performs a boot method selected from a factory-defined boot table.

16 Claims, 3 Drawing Sheets

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| KEY 208 |||||||| BMSP2 206 |||||||| BMSP1 204 |||||||| BMSP0 202 ||||||||

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| BOOTDEF7 316 |||||||| BOOTDEF6 314 |||||||| BOOTDEF5 312 |||||||| BOOTDEF4 310 ||||||||
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| BOOTDEF3 308 |||||||| BOOTDEF2 306 |||||||| BOOTDEF1 304 |||||||| BOOTDEF0 302 ||||||||

SCALABLE BOOT OPTIONS FOR A PROCESSOR/CONTROLLER

CLAIM OF PRIORITY AND RELATED PATENT APPLICATIONS

This nonprovisional application claims priority based upon the following prior United States provisional patent application(s): (i) "SCALABLE STARTUP BOOT OPTIONS FOR AN EMBEDDED PROCESSOR/CONTROLLER," Application No. 62/250,642, filed Nov. 4, 2015, in the name(s) of David Peter Foley and Santosh Kumar Athuru; which is hereby incorporated by reference in its entirety.

FIELD OF THE DISCLOSURE

Disclosed embodiments relate generally to the field of processors and controllers. More particularly, and not by way of any limitation, the present disclosure is directed to scalable boot options for a processor or controller.

BACKGROUND

A processor or controller can have many available methods to boot an application. Some applications using these products may desire to load code from an external memory via one of many communications peripherals into on-chip random access memory (RAM) or even run the program directly from that external memory; others may boot from internal non-volatile memory (NVM); and others may connect to a host for the purpose of programming the internal NVM. In a general purpose processor/controller, which can be programmed for any number of different tasks, it is desirable for the manufacturer to provide a mechanism to allow customers to choose which boot method they prefer. One known method is to provide $\log_2$ (n) pins to allow a selection between n options, e.g., one pin allows two choices, two pins allow four choices, etc. However, this method expends pins, which are a valuable commodity on a processor/controller. Various solutions to the expenditure of pins have been suggested, but none offer both the ability to provide low- or no-pin use while also securing the boot process from unauthorized users.

One way to reduce the number of pins dedicated to boot selection is to have the on-board Central Processing Unit (CPU) listen to all possible communication peripheral ports for a golden signature that signals the selection of the specific port being used. Once such a signature is seen, the boot process is continued via the respective peripheral. However, this method does not allow a customer to disable booting through one or more specific peripherals. All communication peripherals are always enabled. This may not be desirable from a security standpoint because these paths are available for an unauthorized user to download a "spoof" application.

Another way to reduce the number of boot pins is to allow users to program their desired boot method into on-chip NVM. Previous implementations used in the past have had one or more of the following limitations:

The user cannot eliminate all of the boot pins, thereby reducing the available usable pins for the customer;
The user cannot eliminate undesired boot options to secure the boot process; and
The user cannot choose between two or more non-default boot options to allow alternate boot methods (e.g., default boot to Flash and a firmware upgrade option via Serial Peripheral Interface (SPI)).

SUMMARY

Disclosed embodiments address two different stages in the boot process of a processor/controller: 1) booting an un-programmed device (i.e., an NVM left in the initial state and delivered by the manufacturer) and 2) booting a programmed device (i.e., an NVM after a customer programs, writes, or loads his application into the NVM). In the first stage, the boot options are limited to a factory-defined set of hardware pins and the pre-defined options associated with specific values of those pins. In one embodiment, these factory-defined hardware pins can be used for other purposes during stage two, if they are not desired for boot pins. The boot options for the second stage are provided by the user writing desired values into a defined region in the on-chip NVM during stage one. Depending on the implementation, the user has one or more of a greater variety of boot selections to choose from, a selectable number of pins to designate boot options in stage two, and a choice to utilize no boot pins during stage two booting.

In one aspect, an embodiment of a method of booting an integrated circuit is disclosed. The method includes determining whether a boot pin configuration has been programmed; responsive to determining that the boot pin configuration has been programmed, performing a boot method indicated in a user-defined boot table; and responsive to determining that the boot pin configuration key has not been programmed, performing a boot method selected from a factory-defined boot table.

In another aspect, an embodiment of an integrated circuit is disclosed. The integrated circuit includes a central processing unit (CPU); a plurality of peripheral devices that can be used by the CPU to boot an application; a plurality of pins for input to and output from the CPU and the plurality of peripheral devices, wherein a first pin of the plurality of pins is operable to identify a selection of a boot method for an initial boot; a non-volatile memory comprising a plurality of user boot definitions, wherein a user boot definition of the plurality of user boot definitions is programmable with an identifier of a peripheral device of the plurality of peripheral devices that is selectable for booting; and a validity key that indicates whether the user boot definitions are valid.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

FIG. 2 depicts a User Boot Pin Configuration for a controller according to an embodiment of the disclosure;

FIG. 3 depicts a User-Defined Boot Table for a controller according to an embodiment of the disclosure.

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A CPU is the electronic circuitry within a computer that carries out the instructions of a computer program. A CPU is sometimes referred to as a processor and a microprocessor can be a CPU that is formed on one or possibly a few integrated circuit (IC). A controller or microcontroller can refer to a processor that interfaces with one or more peripheral devices, often on the same chip, such as in an SOC.

Figure 1:
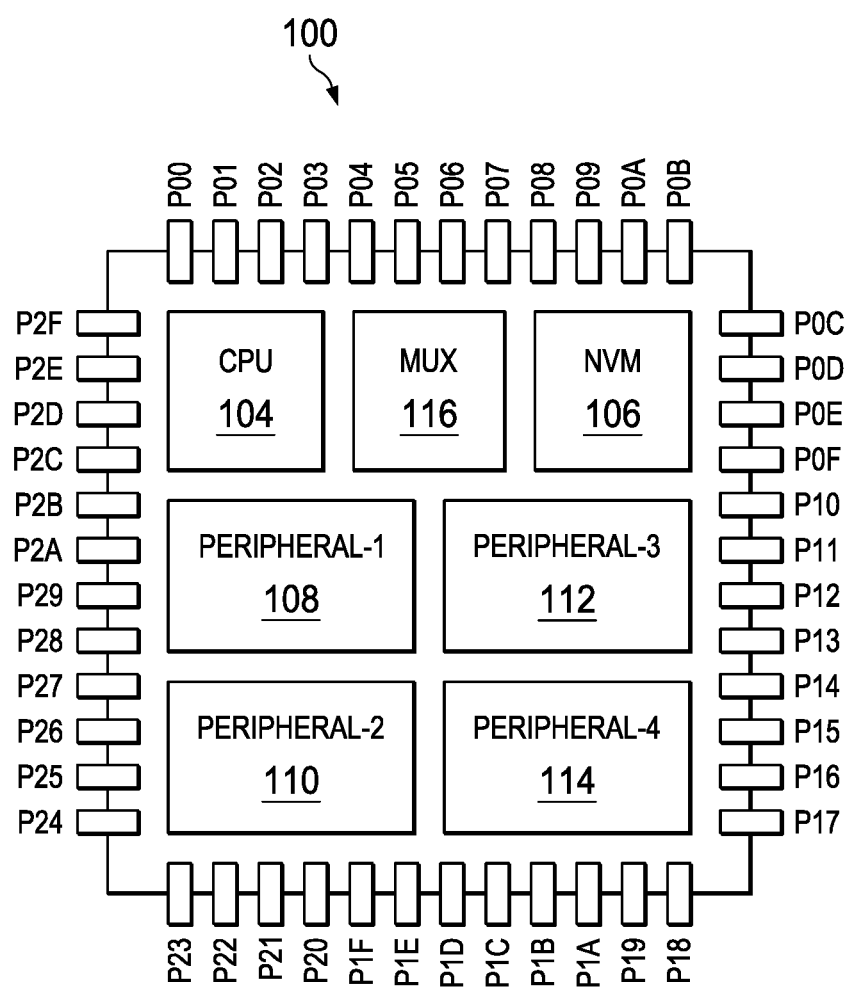
FIG. 1 depicts an example of a System on Chip (SOC) that can be used to practice the disclosed method of booting a controller according to an embodiment of the disclosure.

Referring now to FIG. 1, an SOC 100 is shown that can be used to practice the disclosed method of booting a processor. SOC 100 contains CPU 104, which will execute a user application, and non-volatile memory 106. Non-volatile memory can include, for example, Erasable Programmable Read-Only Memory (EPROM), Electrically Erasable Programmable Read-Only Memory (EEPROM), Ferroelectric Random Access Memory (F-RAM), One-Time Programmable (OTP) memory, or any existing to yet-to-be-designed memory that holds it's contents when power is turned off. In one embodiment, SOC 100 includes a first section of OTP memory that is programmed by the manufacturer and a second section of OTP memory that is programmable by the user, as well as additional NVM that is re-writable under the proper conditions. SOC 100 also contains a number of peripherals, which in this figure are shown as Peripheral-1 108, Peripheral-2 110, Peripheral-3 112 and Peripheral-4 108. Peripherals 108, 110, 112, 114 can include any combination of Flash, Controller Area Network (CAN-A), CAN-B, SPI, Universal Serial Bus (USB), Serial Communications Interface (SCI), Inter-Integrated Circuit (I2C), Universal Asynchronous Receiver/Transmitter (UART), as well as other peripherals both known and currently unknown.

In addition to the CPU and peripherals, SOC 100 has a number of pins by which the device is able to receive input and provide output. In the embodiment shown, SOC 100 has forty-eight pins, numbered P01-P2F. General Purpose Input/Output (GPIO) Multiplexor (MUX) 116 can multiplex the general purpose I/O pins to allow selection of pins for various purposes. For example, the user can program the NVM to indicate pins will be used in Stage 2 for boot pins. Additionally, the manufacturer may designate that certain types of I/O can be handled on a selection of pins and allow the user to program a specific pin selection into NVM.

As noted above, Applicant addresses two separate stages of booting, i.e., booting an un-programmed or fresh device and booting a programmed device. During the Stage 1, booting is limited to a factory defined set of hardware pins. Since the primary purpose of the first stage is to program the device, the dedicated boot pins in Stage 1 do not have to be maintained as boot pins in Stage 2. In addition to defining the boot pins during stage one, the manufacturer also defines a number of boot methods that are available during stage one and associates these boot methods with respective values that can be presented on the boot pins.

Table 1 below illustrates an implementation in which two hardware pins are defined as default boot method selection pins, giving four default boot options. It will be understood by one skilled in the art that this number is arbitrary as there is no minimum or maximum number of pins required by this solution. The table shown here is also referred to herein as a factory-defined boot table. In the example implementation shown, Default Boot Method 0 uses Parallel I/O, which may use e.g., eight designated GPIO pins on the chip to boot; Default Boot Method 1 uses SCI; Default Boot Method 2 uses CAN; and Default Boot Method 3 uses USB. Furthermore, it is possible to define an alternate boot method to coexist with at least one option, such as the boot to non-volatile memory option shown as Method 3. Such an alternate boot method may be desired, e.g., when the user's application is in development and not yet into production. In one embodiment, if a method is designated on the boot pins during Stage 1 boot, a given location in the NVM is examined to determine its value. If a first value is found, the application is in development and the alternate method is selected. If the first value is not found, the application is in production and the default boot method assigned to this value will be performed.

TABLE 1

| Boot Mode Select Pin 1 | Boot Mode Select Pin 0 | Default Boot Method |
|---|---|---|
| 0 | 0 | Default Boot Method 1 (e.g., PARALLEL IO) |
| 0 | 1 | Default Boot Method 2 (e.g., SCI) |
| 1 | 0 | Default Boot Method 3 (e.g., CAN) |
| 1 | 1 | Default Boot Method 4/Alternate Method (e.g., Flash/USB) |

During Stage 1 boot, the user sets each of the default boot mode select pins to either one (high) or zero (low), with the combination of the values on the pin(s) designating the route via which the user will supply programming for NVM 106.

The boot options for Stage 2 are chosen via user-defined values written into a specific region of on-chip NVM, which in one embodiment is a configuration word. The user first determines the number of boot method options to be selectable via boot pins. If a user desires to always boot using a single input route, e.g., Flash, no pins are needed. If the user would like to typically boot to Flash but have an option to boot to a peripheral by toggling a pin, one pin is needed. It is also possible to allow for more options with more pins. The user designates the specific pins to be used during Stage 2 boot using the configuration that is stored in on-chip NVM. An example Boot Pin Configuration Word 200, which is also referred to herein as a Boot Pin Configuration Table, is shown in FIG. 2 and is discussed with reference to Table 2 below. References in this application to a controller, processor, microprocessor or microcontroller are intended to cover all of these possibilities, as well as covering a state machine. Similarly, reference to data stored in a table is intended only to reference a systematic arrangement of data and is not limited to a particular structure.

Boot Pin Configuration Table 200 can be used to allow zero to three pins to be used for Stage 2 boot. When programmed, each of Virtual Boot Mode Select Pins BMSP0 206, BMSP1 208, BMSP2 210 will either be assigned a physical GPIO pin or else disabled. The fields in Boot Pin Configuration Table 200 are shown below:

TABLE 2

| Bit positions | Name | Usage |
|---|---|---|
| Bits 0:7 (8 bits) | BMSP0 - Boot mode select Pin0 | Up to 254 possible GPIOs; 0x00 = GPIO0 0x01 = GPIO1 ... 0xFE = GPIO254 0xFF = Disabled (value is treated as a zero) |
| Bits 15:8 (8 bits) | BMSP1 - Boot mode select pin1 | Same as above but for boot mode select pin 1 |
| Bits 23:16 (8 bits) | BMSP2 - Boot mode select pin 2 | Same as above but for boot mode select pin 2 |
| Bits 31:24 (8 bits) | KEY | These 8 bits when programmed to 0x5A tells the boot ROM code that the rest of the bits in this register are valid. If this value is not 0x5A the contents of this register are ignored and the default boot pins are chosen. |

As seen in Table 2, each eight bits are used to designate a Boot Method Select Pin (BMSP). Bits 0-7 are used to designate BMSP0 202; Bits 8-15 designate BMSP1 204; and Bits 16-23 designate BMSP2 206. Each eight bits can be used to designate a hardware pin and in the embodiment shown, any of 254 pins can be designated. One value, which here is 0xFF, designates that the pin is disabled and will not be used during boot. One can see that using Boot Pin Configuration Table 200, a user can designate up to eight different boot options if all three pins are assigned. The user can also designate a single boot method by disabling all three virtual pins. In this example, Bits 24-31 of Boot Pin Configuration Table 200 form Boot Pin Configuration Key 208 that identifies whether the pins have been assigned. When programmed to an example value of 0x5A, the register is valid; otherwise the contents will be ignored as invalid.

During a Stage 2 boot, the value provided on each of the assigned boot pins is obtained, while the value of a disabled pin is treated as zero. The values are concatenated to define a unique boot method pointer. This pointer points to an entry within a second configuration word in NVM, Boot Definition Table 300, also referred to as User-Defined Boot Table 300, which is shown in FIG. 3. User-Defined Boot Table 300 is also defined by the user by writing in NVM and identifies all boot methods selected by the user for Stage 2 boot, shown here as BOOTDEF0 302, BOOTDEF1 304, BOOTDEF2 306, BOOTDEF3 308, BOOTDEF4 310, BOOTDEF5 312, BOOTDEF6 314, BOOTDEF7 316. An example layout of the fields in User-Defined Boot Table 300 is shown in Table 3:

TABLE 3

| BOOTDEF Name | Boot Method Pointer Value | Bits | Description |
|---|---|---|---|
| BOOT_DEF0 | 0 | 7:0 | Bits 7:5: Set the alternate/additional boot options. This can include |

TABLE 3-continued

| BOOTDEF Name | Boot Method Pointer Value | Bits | Description |
|---|---|---|---|
| | | | changing the GPIOs for a particular boot peripheral or specifying a different flash entry point. Bits 4:0: Set the boot mode number from the device boot mode identifiers table. |
| BOOT_DEF1 | 1 | 15:8 | Same |
| BOOT_DEF2 | 2 | 23:16 | Same |
| BOOT_DEF3 | 3 | 31:24 | Same |
| BOOT_DEF4 | 4 | 39:32 | Same |
| BOOT_DEF5 | 5 | 47:40 | Same |
| BOOT_DEF6 | 6 | 55:48 | Same |
| BOOT_DEF7 | 7 | 63:56 | Same |

In this embodiment, User-Defined Boot Table 300 contains eight entries, which is the number of options that can be selected by the three possible pins shown in FIG. 2. In this example, each entry of User-Defined Boot Table 300 is eight bits long, with Bits 0-4 of the entry indicating the Peripheral device that will be used during Stage 2 boot and Bits 5-7 indicating options for use with the designated peripheral. The manufacturer will have provided a peripherals table that assigns values to each of the peripherals on SOC 100 that can be utilized for booting. An example of a boot peripheral identifiers table is shown in Table 4 below:

TABLE 4

| Value | Boot Mode |
|---|---|
| 0 | Peripheral Boot 0 |
| 1 | Peripheral Boot 1 |
| 2 | Peripheral Boot 2 |
| 3 | Peripheral Boot 3 |
| 4 | Peripheral Boot 4 |
| . | . |
| . | . |
| . | . |
| N | Peripheral Boot N |

In one embodiment, for each peripheral defined in User-Defined Boot Table 300, the user can select among optional variations. In one embodiment, the options include a designation of the pin(s) that will be used to boot with this peripheral. In an example implementation, an access method may be available using a choice of pins, e.g., the manufacturer may designate that CAN is available on Pins 21-22 or alternatively on Pin 35-36; the options field can be used to specify which group of pins is chosen by the user. In one example embodiment, the user can use these bits to designate an entry point to the peripheral, e.g., Flash, that is different from a usual entry point.

Figure 4:
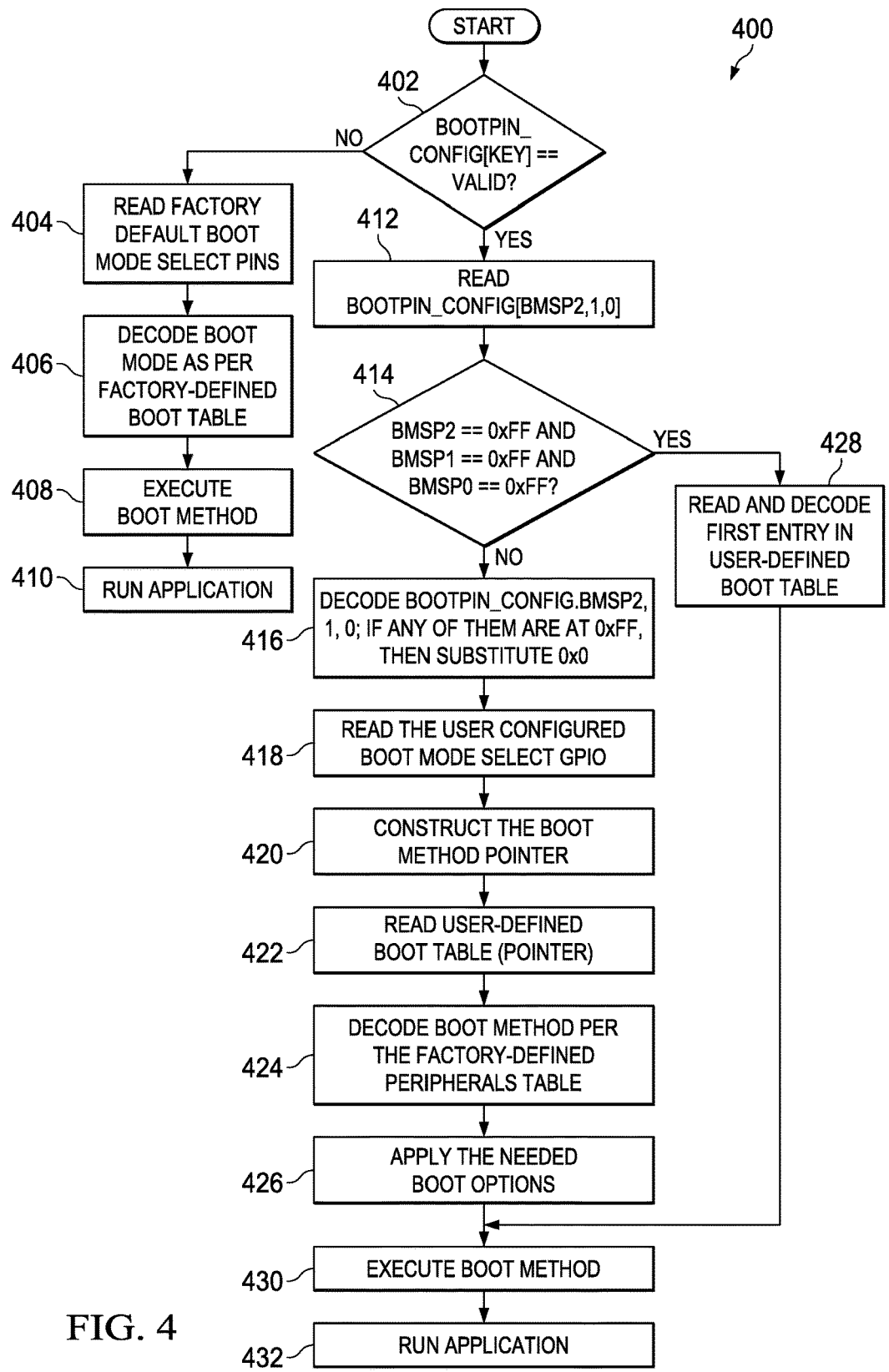
FIG. 4 depicts a flowchart of method of booting a controller according to an embodiment of the disclosure.

FIG. 4 illustrates an example Procedure 400 that can be used by the device to determine the boot method to be used. When the procedure begins, i.e., when the device is powered on, the device will determine (402) whether the boot pin configuration key is valid. If the boot pin configuration key is not valid, the user has not yet written a boot pin configuration to NVM 106, so the factory-defined boot pins will be used. The device reads (404) the factory-defined boot pins. The values that are read are decoded (406) according to the factory-defined boot table and the designated boot method is executed (408) to boot the device. Once the boot is completed, the user application is then run (410).

If the boot pin configuration key checked at element 402 is valid, the user has written the desired boot pin configuration to NVM 106, so the user configuration will be utilized. The device reads (412) Boot Pin Configuration Table 200 and determines whether all of the pins are disabled (414). If all pins are not disabled, the configuration of the boot pins is decoded (416) to determine the user-defined boot pins; if a pin is disabled, the value of that pin is set to zero. The selected pins are read (418) to determine their value and the boot mode value, which is a pointer to User-Defined Boot Table 300 is constructed (420) using the results of 416 and 418. The entry in User-Defined Boot Table 300 is read (422). The boot mode value that is read in User-Defined Boot Table 300 is decoded (424) using the factory-defined peripherals table so that the appropriate peripheral device is selected and applies (426) any specific options from the user-defined boot table. The boot method is then executed (430) and the user application is run (432).

Back at decision 414, if all of the pins are disabled, the first entry in User-Defined Boot Table 300 is read and decoded (428), the boot method designated in the first entry is executed (430) and then the user application is run (432).

Applicants have disclosed an electronic device and method of booting a central processing unit on the device. The disclosed device and method can provide greater flexibility to a user to designate as many or as few of the available boot methods as they want to be able to utilize once the device is programmed. Advantages of the disclosed device and method may include one or more of the following:

- The device can always boot to on-chip NVM without using boot mode pins;
- Conserves pins for the application
- Enables a secure boot process
- A user can switch between his selection of multiple boot methods without reprogramming the device;
  - One or more alternate boot method(s) can be utilized to perform a second function ancillary to the application such as a firmware upgrade or a system diagnosis;
- One or more alternative methods can be offered to the user for booting during development when the device is not programmed;
- Pins used to program the device (i.e., Stage 1) can be used for other purposes after programming (i.e., Stage 2).

The provided flexibility allows users more to tailor boot procedures to their specific needs.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method comprising:
   determining whether a boot pin configuration for a virtual pin has been programmed by determining whether a boot pin configuration key in a boot pin configuration table is valid, wherein the virtual pin is mapped to a physical pin;
   responsive to determining that the boot pin configuration for the virtual pin has been programmed, performing a boot method indicated in a user-defined boot table; and
   responsive to determining that the boot pin configuration for the virtual pin has not been programmed, performing a boot method selected from a factory-defined boot table.

2. The method as recited in claim 1 wherein performing a boot method indicated in the user-defined boot table comprises:
   determining whether all of a set of user-defined boot pins are disabled; and
   if all of the set of user-defined boot pins are disabled, performing a boot method defined at a pre-defined position of the user-defined boot table.

3. The method as recited in claim 2 wherein if at least one of the set of user-defined boot pins is not disabled, decoding values provided on the set of user-defined boot pins to construct a first pointer and performing a boot method in the user-defined boot table that is pointed to by the first pointer.

4. The method as recited in claim 3 wherein decoding the values provided on the set of user-defined boot pins comprises, if any of the user-defined boot pins are disabled, defining the input on the respective user-defined boot pin as a first value.

5. The method as recited in claim 2 further comprising reading the boot pin configuration to determine the set of user-defined boot pins.

6. The method as recited in claim 1 wherein performing the boot method selected from a factory-defined boot table comprises:
   reading a set of factory-defined boot pins;
   decoding values provided on the factory-defined boot pins to construct a second pointer; and
   performing a boot method in the factory-defined boot table that is pointed to by the second pointer.

7. The method as recited in claim 1 further comprising programming a first peripheral from a factory-defined peripherals table into multiple entries in the user-defined boot table.

8. The method as recited in claim 1 further comprising disabling the virtual pin in the boot pin configuration.

9. The method as recited in claim 1 wherein omitting a given peripheral from being referenced in the user-defined boot table ensures that the given peripheral cannot be used to boot once the boot pin configuration has been programmed.

10. An integrated circuit (IC) chip comprising:
    a central processing unit (CPU);
    a plurality of peripheral devices that can be used by the CPU to boot an application;
    a plurality of virtual pins for input to and output from the CPU and the plurality of peripheral devices, wherein a first pin of the plurality of virtual pins is operable to identify a selection of a boot method for an initial boot and each pin of the plurality of virtual pins is mapped to a respective physical pin;
    a non-volatile memory comprising a plurality of user boot definitions, wherein a user boot definition of the plurality of user boot definitions is programmable with an identifier of a peripheral device of the plurality of peripheral devices that is selectable for booting; and a boot pin configuration key in a boot pin configuration table that indicates whether the user boot definitions are valid.

11. The IC chip as recited in claim 10 wherein the user boot definition is further programmable to indicate boot options.

12. The IC chip as recited in claim 10 further comprising a peripherals table that associates the identifier with a respective peripheral device.

13. The IC chip as recited in claim 10 wherein the non-volatile memory further comprises the boot pin configuration table, the boot pin configuration table is programmable to map the physical pins to the respective virtual boot pins.

14. The IC chip as recited in claim 13 wherein a virtual boot pin that is mapped to a given value is disabled.

15. The IC chip as recited in claim 14 wherein if all virtual boot pins are disabled, the IC boots to a first peripheral device in a user-defined boot table.

16. The IC chip as recited in claim 13 further comprising a multiplexor operable to selectively connect pins to respective peripherals.

* * * * *